United States Patent [19]

Reymann

[11] Patent Number: 4,622,807

[45] Date of Patent: Nov. 18, 1986

[54] PLANETARY BLADE ASSEMBLY FOR A POWER LAWN MOWER

[76] Inventor: John P. Reymann, 999 W. 66 St., Hialeah, Fla. 33012

[21] Appl. No.: 732,340

[22] Filed: May 10, 1985

[51] Int. Cl.⁴ ............................................. A01D 34/76
[52] U.S. Cl. ........................................ 56/295; 56/12.9
[58] Field of Search ............... 56/295, 255, 12.9, 13.4, 56/17.6, 192, 13.6

[56] References Cited

U.S. PATENT DOCUMENTS

| | | | |
|---|---|---|---|
| 3,246,460 | 4/1966 | Patterson et al. | 56/235 |
| 3,835,630 | 9/1974 | von der Au | 56/295 |
| 4,121,405 | 10/1978 | Wolf | 56/295 |
| 4,199,922 | 4/1980 | van der Lely | 56/295 |

Primary Examiner—Robert Peshock
Assistant Examiner—David I. Tarnoff
Attorney, Agent, or Firm—John Cyril Malloy

[57] ABSTRACT

A cutting assembly including a plurality of blade elements concurrently rotated throughout a circular cutting path about a substantially centrally disposed drive shaft and independently about a central, transverse axis of rotation of each of the plurality of cutting blades and including a planetary gear assembly serving to interconnect the plurality of cutting blades to a drive shaft and a secured driven drive arm for at least partially supporting and positioning the plurality of cutting blades.

4 Claims, 8 Drawing Figures

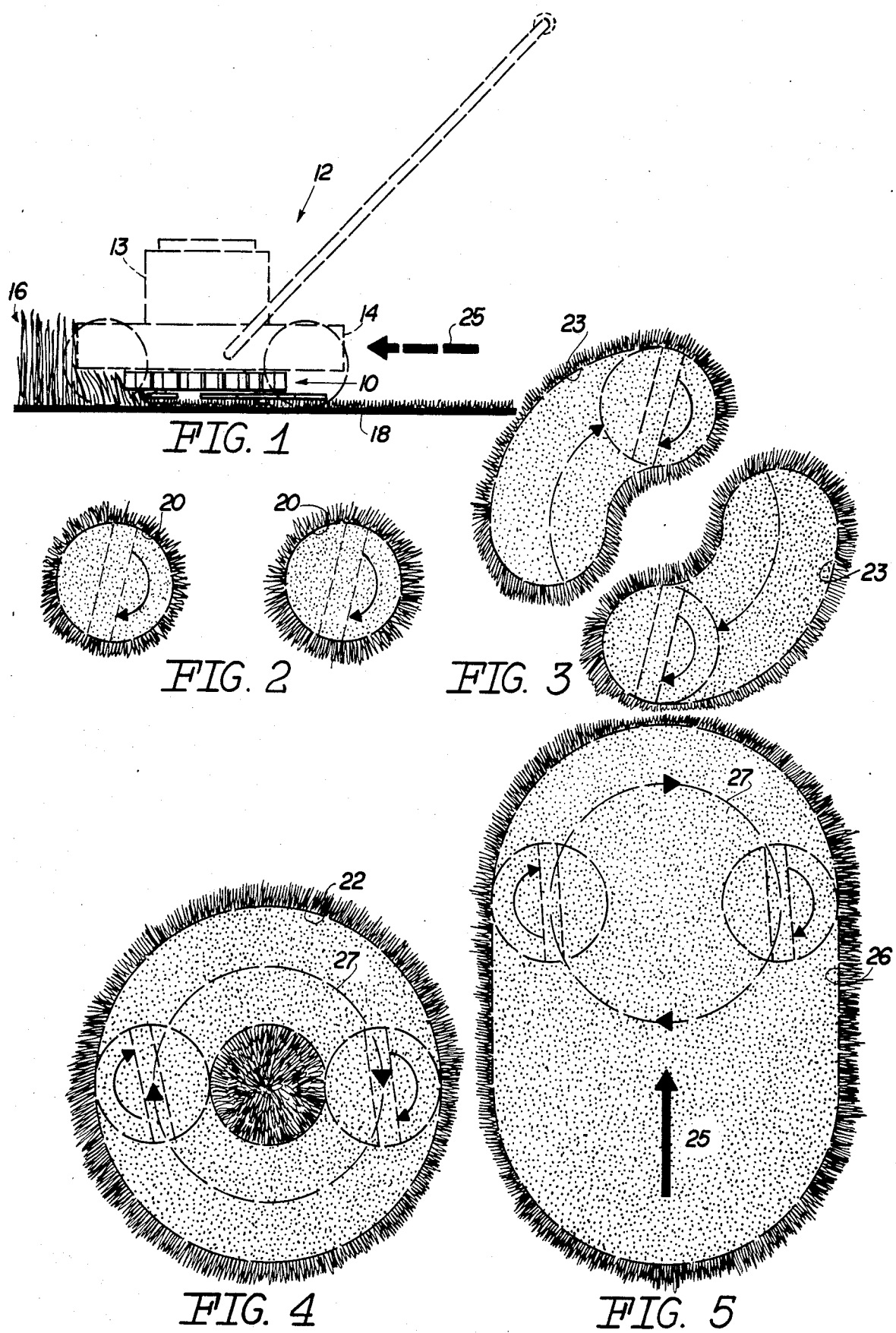

PLANETARY BLADE ASSEMBLY FOR A POWER LAWN MOWER

BACKGROUND OF THE INVENTION

1. Field of the Invention

This invention relates to a cutting assembly comprising a driving means rotatably interconnected to a cutting blade assembly through a planetary gear arrangement such that a plurality of spaced apart cutting blades are driven about a circular cutting path and concurrently are driven, through interconnection of the planetary gear system, so as to rotate about a central transverse axis thereof.

2. Description of the Prior Art

Power type lawn mowers have been in use for many years and are applicable, dependent upon particular design and construction configurations, to both residential and commercial type lawns. Power mowers generally include two types such as a reel type mower and a rotary type mower. Reel mowers are recogized as having an advantage of providing a smooth and even close cut and are therefore frequently used on residential lawns and other commercial applications where a close, smooth, sculptured cut is preferred. However, such reel type mowers are frequently heavier in construction than their counterpart rotary mowers thereby requiring greater power demands. In fact certain reel type mowers are constructed such that the driving motor is enhanced in size and capacity so as to power drive the wheels as well as turn the reel for cutting. In other words, the power required to cut the grass constitutes only a small fraction of the total power required to propel the machine over the lawn or surface being cut.

Rotary type mowers on the other hand are frequently much lighter, easier to operate and do not require power driven wheels or the disadvantages associated with such increased power consumption. However, recognized disadvantages of this type of power mower include inconsistency in providing a satisfactory close or smooth cut on close residential lawns or golf greens. Such rotary type mowers have been known to cut into the turf or ground surface when such undulates or is even moderately uneven. Accordingly, there is a recognized need in the prior art for a power mower structure incorporating a cutting assembly which provides a smooth, even and close cut. At the same time the mower should be relatively light in weight and not require increased power demands for driving the wheels of the carriage or support platform.

The prior art includes numerous cutting assemblies which attempt to increase the operative characteristics of a power lawn mower. Such prior art structures referred to are of the type disclosed in the U.S. patents to La Bonte, U.S. Pat. No. 2,478,587; Dripps, U.S. Pat. No. 25,843; Friesz, U.S. Pat. No. 536,464; Tweedale, U.S. Pat. No. 3,254,481; Cousino, U.S. Pat. No. 3,657,868; Treen, U.S. Pat. No. 4,048,791; Greene, U.S. Pat. No. 1,057,236; and Miller, U.S. Pat. No. 3,058,286. While the structures disclosed in the above noted patents are considered operable and applicable for their intended function, it is believed that there is still a recognized need in the lawn mower industry for a lightweight power lawn mower providing a close smooth cut and including a cutting assembly which overcomes the above set forth disadvantages while providing the proper performance and operational characteristics.

SUMMARY OF THE INVENTION

The present invention is directed to a cutting assembly of the type to be used in combination with a power lawn mower. A support platform, defining the motor base serves to rotatably drive a drive shaft. The support platform supports a cutting assembly in what may be an adjustable position relative to the lawn or surface being cut.

More specifically, the cutting assembly of the present invention comprises a drive means including a depending, centrally located, rotatably driven drive shaft mounted on the support platform. The drive shaft is secured to a midpoint of a drive arm which extends outwardly from and is oriented in transverse relation to the drive shaft. The drive arm rotates with the drive shaft and further includes blade means in the form of a plurality, preferably two, cutting blades mounted or supported at opposite ends of the drive arm.

Upon rotation of the drive shaft by activation of the drive motor, the drive arm also rotates. In addition, the plurality of cutting blades are driven about a circular cutting path. Each of the blades are disposed in spaced apart relation to one another substantially along the length of the drive arm and serve to rotate with the drive arm.

The present invention also includes a gear assembly comprising a central gear substantially fixed in nonrotating relation to the support platform. A plurality of planetary gears are intermeshingly engaged about the periphery of the central gear in spaced apart relation to one another. Each of the planetary gears has fixedly secured thereto a depending mounting shaft which has one of the aforementioned cutting blades secured thereto so as to rotate therewith. Each of the mounting shafts also extend through the respective opposite ends of the drive arm in their supporting relation to the respective cutting blades.

Accordingly, rotation of the drive arm causes the respective cutting blades, as well as the mounting shafts and the associated or connected planetary gears, to rotate about the aforementioned circular cutting path. Such forced rotation of the mounting shafts and associated planetary gears causes intermeshing engagement and travel of the planetary gears continuously about the circular periphery of the central gear. This in turn causes rotation of the planetary gears about a centrally and transversely disposed axis of rotation which is colinear to the longitudinal axis of each of the mounting shafts. In that the respective planetary gears, mounting shafts, and cutting blades are all fixedly interconnected to one another, rotation of the planetary gears in turn causes rotation of the associated cutting blades about their aforementioned axis of rotation.

It is readily seen therefore that upon activation of the drive shaft each of the blades are forced to travel about the circular cutting path. Concurrently, they are also forced to rotate about a central axis of rotation due to the interaction of the planetary gears and the central gear as the former are forced to rotate about the periphery of the latter.

A casing is provided in covering and protective relation to the gear assembly so as to prevent debris from fouling such gear assembly wherein such debris is frequently thrown off from the cutting blades during their cutting operation.

It is readily seen therefore that the cutting blades travel repeatedly about the circular cutting path and define their own round cutting path based on the above set forth concurrent rotation thereof.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a side view of the operation of a power mower, represented in broken lines, and the depending relation of the subject cutting assembly and its disposition relative to the lawn or surface being cut.

FIG. 2 is a top plan view and at least partially schematic view of a round cutting path of each of the individual cutting blades comprising the cutting assembly.

FIG. 3 are cutting path segments followed by the individual cutting blades during their rotation about their own axis of rotation and as they are forced to rotate about a defined circular cutting path.

FIG. 4 is a cutting path defined by the cutting assembly of the present invention wherein the power mower is maintained in a stationary position.

FIG. 5 is the accomplished cutting path of the subject cutting assembly when the power mower is forced to travel in a forward direction as indicated by the directional arrows of FIG. 5 and FIG. 1.

Like reference numerals refer to like parts throughout the several views of the drawings.

DETAILED DESCRIPTION OF THE PREFERRED INVENTION

Figure 6:
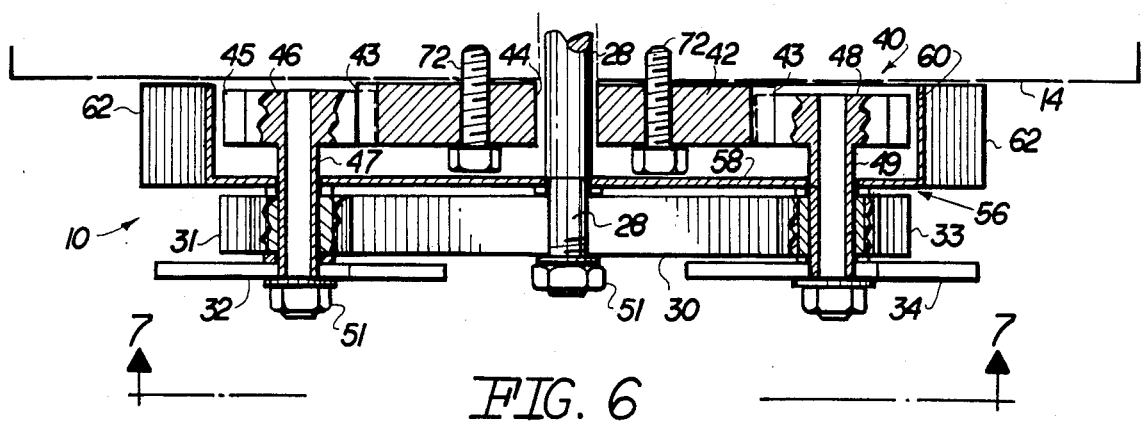
FIG. 6 is a sectional view showing structural details of the cutting assembly of the present invention.

As shown in FIGS. 1 through 8, the present invention is directed towards a cutting assembly (shown in detail in FIG. 8) and generally indicated as 10. The cutting assembly is of the type primarily designed for use with a power mower generally indicated as 12 and represented in broken lines in FIG. 1. The cutting assembly 10 of course is disposed in depending and supporting relation to what may be considered a support platform 14 of the power mower 12 in cutting relation to a lawn 16 or surface 18 being cut.

As discussed in greater detail hereinafter, operation of the cutting assembly results in concurrent rotation of individual cutting blades in separate round cutting paths 20 as shown in FIG. 2 as well as forced rotation about a composite circular cutting path 22 as shown in FIG. 4. As the individual cutting blades begin their forced rotational movement about the circular cutting path 22, path segments 23 are formed as shown in FIG. 3. Similarly, as the power mower 12 begins a forward or linear motion as indicated by directional arrows 25, an elongated preferred cutting path is established as at 26 and represented in FIG. 5.

Figure 7:
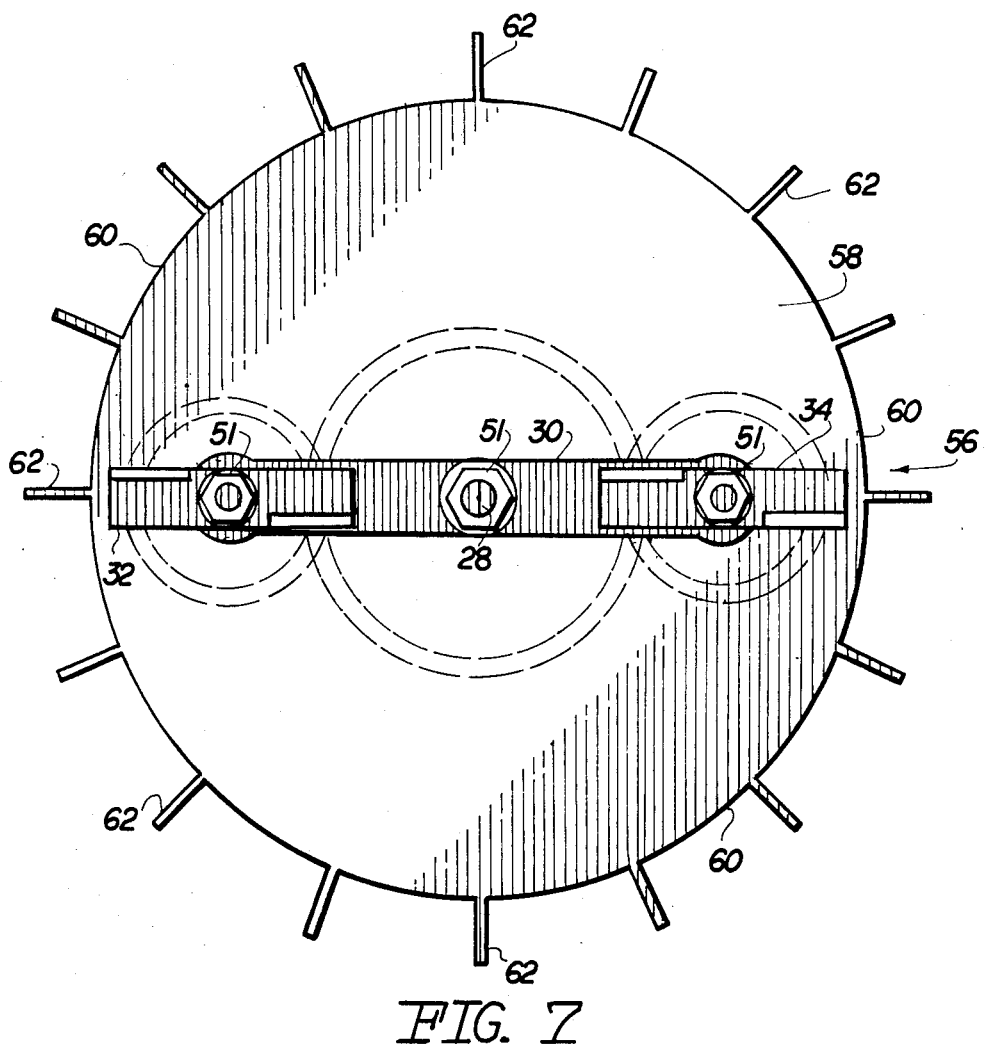
FIG. 7 is a bottom plan view along line 7—7 of FIG. 6.
Figure 8:
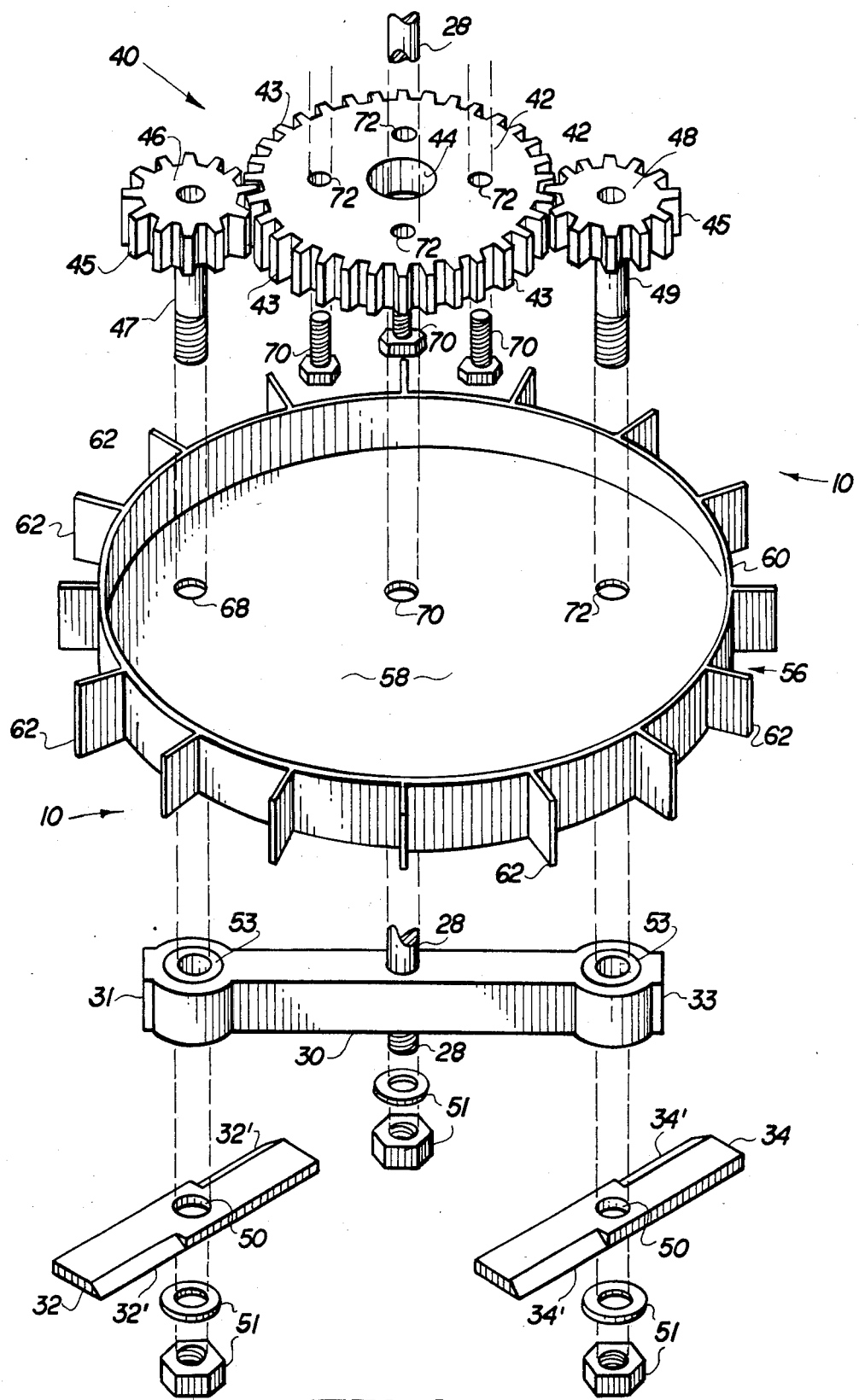
FIG. 8 is a perspective view in exploded form and being partially cutaway showing structural details of the various components of the subject cutting assembly.

With regard to FIGS. 6, 7 and 8, the cutting assembly 10 of the present invention comprises a drive means including a drive shaft 28 extending downwardly in depending relation from the support platform 14. The drive shaft is rotationally driven upon activation of a conventional drive motor generally mounted in a housing 13 in a conventional fashion. The drive means further includes an elongated drive arm 30 secured at substantially its midpoint to the drive shaft 28 so as to rotate therewith. Opposite ends of the drive arm 30 as at 31 and 33 are thereby forced to travel about a predetermined circular path 27 (see FIGS. 4 and 5).

A blade means is mounted on the drive arm so as to rotate therewith and specifically includes a plurality of blade elements 32 and 34 each having an elongated configuration and preferably including cutting edges 32' and 34' respectively integrally formed to extend along oppositely disposed longitudinal edges thereof as shown in FIG. 8.

The cutting assembly 10 further includes a gear assembly generally indicated as 40. The gear assembly includes a central gear 42 including a plurality of teeth 43 integrally formed continuously about the outer periphery thereof. Central gear 42 is fixedly secured in depending relation relative to the support platform 14 so as to be stationary relative to the rotating drive shaft 28 which passes through a central aperture 44 formed therein. The gear assembly 40 further includes a plurality of planetary gears 46 and 48 each having a plurality of teeth 45 integrally formed continuously about their respective peripheries. Further, each of the planetary gears 46 and 48 includes a fixedly secured mounting shaft 47 and 49 respectively attached to rotate with a respective planetary gear and extending through a gearing or bushing structure 53 formed in each of the opposite ends 31 and 33 of the drive arm 30. The distal or opposite end of each mounting shaft 47 and 49 is secured by proper connector elements 51 to a respective one of the cutting blades 32 and 34 by passing through an integrally formed central aperture 50 therein. By virtue of this interconnection, the individual blades 32 and 34 are fixedly secured so as to rotate with the respective mounting shafts 47 and 49. These mounting shafts in turn rotate with the respectively attached planetary gears 46 and 48. In that the mounting shafts 47 and 49 are secured to opposite ends 31 and 33 of drive arm 30, they are also forced to travel about the circular path 27. Due to the bushing and/or bearing assembly 53, relative rotation between the respective shafts 47 and 49 and the opposite ends 31 and 33 is allowed to occur during their forced travel about the circular path 27. Such relative rotation in turn causes or forces the individual planetary gears 46 and 48 to travel in intermeshing relation about the periphery of central gear 42. The movable intermeshing engagement of the respective teeth 43 of the central gear 42 and the teeth 45 of the planetary gears causes rotation of the planetary gears about a centrally disposed transverse axis of rotation which is colinear to the longitudinal axis of the respective mounting shafts 47 and 49. The rotation of the planetary gears 46 and 48 in turn causes rotation of the indivudual cutting blades 32 and 34 relative to the drive arm 30. Accordingly, as shown in the respective paths of travel in FIGS. 2 through 5, a circular cutting path 22 is defined by the concurrent rotation of the individual cutting blades 32 and 34 with the drive arm 30 about the circular path 27 and concurrently relative thereto about their own respective round cutting paths 20 (FIG. 2). The cutting paths collectively define the circular cutting path 22 (FIG. 4) when the power mower 12 is stationary and the elongated cutting path 26 (FIG. 5)

when the power mower 12 is forced to travel in the direction indicated by direction arrows 25. Further structural features of the present invention include the provision of a casing generally indicated as 56 including a base portion 58 and an upstanding transversely oriented continuous side wall 60. The casing is disposed and configured for substantially protective and surrounding relation to the gear assembly 40 as it is mounted on the drive shaft and rotatable therewith relative to the gear assembly. Deflecting means is formed on exterior surface of the casing and comprises a plurality of outwardly extending fin elements 62 disposed transversely to the outer surface of side wall 60 and further disposed in spaced apart relation to one another. Such deflecting fins cause a forced air flow about the cutting assembly during rotation of the casing 56 and the fins 62 thereon prevent fouling or collection of debris being projected from the cutting blades 32 and 34 during cutting of the lawn 16 and/or traveling over surface 18 (see FIG. 1).

Further structural features of the subject cutting assembly include a plurality of apertures 68, 70 and 72 integrally formed in the base 58 of casing 56 and specifically disposed and dimensioned to allow passage therethrough of the respective mounting shafts and drive shaft 48, 28 and 49 for interconnection with the drive arm 30 and cutting blades 32 and 34.

Additional structural features of the present invention include the fixed attachment of the central gear 42 to the support platform 14 through the inclusion of a plurality of connector elements 70 passing through individual apertures 72 formed in the body of the central gear 42.

What is claimed is:

1. A cutting assembly of the type primarily designed for use with a power lawn mower, said assembly comprising:
   (a) a drive means for rotatably driving said cutting assembly including a drive shaft extending from a supported driven relation with a support platform,
   (b) said drive means comprising a drive arm fixedly secured to said drive shaft so as to rotate therewith, said drive arm extending transversely outwardly from said drive shaft in opposite directions for a substantially equal distance and terminating in opposite ends,
   (c) blade means comprising at least two blade elements each attached to one of said opposite ends of said drive arm and movable in a common circular cutting path therewith,
   (d) a gear assembly interconnected between said driving means and said two blade elements and in rotatably driving relation to said blade elements,
   (e) said gear assembly comprising a sun gear fixedly secured to said support platform and disposed in coaxial relation to said drive shaft; a plurality of planet gears equal in number to said blade elements and disposed in spaced relation to one another and in intermeshing engagement with said sun gear about the outer periphery thereof,
   (f) a plurality of support shafts equal in number to said blade elements, each support shaft fixedly secured at one common end to one of said planet gears and at an opposite common end to one of said blade elements,
   (g) each of said support shafts rotatably connected to said drive arm so as to rotate therewith along said common circular path, each of said support shafts and respective planet gears and blade elements attached thereto and rotatable as a unit about a central longitudinal axis of said respective support shafts,
   (h) said mounting shafts and respective blade elements rotatable about said circular cutting path upon rotation of said drive arm and structured to accomplish concurrent rotation of each of said blade elements about said central longitudinal axis of said respective mounting shafts, the latter rotation of said cutting blades provided by movable intermeshing engagement of said planetary gears about the outer periphery of said sun gear, and
   (i) a casing mounted on said drive shaft above said drive arm and substantially enclosing said gear assembly and rotatable therewith, wherein said casing comprises a base and a continuous side wall extending about a periphery of said base in substantially outstanding, transverse relation thereto, deflection means for preventing fouling of said gear assembly by debris from said blade means, said deflection means secured to an outer surface of said continuous side wall and projecting outwardly therefrom, said deflection means further structed to establish a forced air flow about said casing for the deflection of debris.

2. A cutting assembly as in claim 1 wherein said deflection means comprises a plurality of fin elements disposed in spaced apart relation to one another and extending radially outward from said side wall.

3. A cutting assembly as in claim 1 wherein each of said blade elements are configured to define a round cutting path when rotated about said axis of rotation, said circular cutting path comprising a diameter defined by a length of said drive arm plus a distance of outer extension of each of said blade elements beyond said respective opposite ends of said drive arm.

4. A cutting assembly as in claim 1 wherein each of said plurality of mounting shafts have a sufficient length to extend from an interior of said casing through said base into supporting attachment with said respective blade element on an exterior of said casing, said plurality of mounting shafts and said drive shaft extending through said base to an exterior portion of said casing, mounting shafts and drive shaft interconnected for rotation with one another along with said drive arm upon rotational activation of said drive shaft.

* * * * *